United States Patent
Fujiyoshi

(10) Patent No.: US 6,920,482 B1
(45) Date of Patent: Jul. 19, 2005

(54) INFORMATION PROCESSING APPARATUS, SYSTEM AND METHOD

(75) Inventor: Hiroyuki Fujiyoshi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/516,112

(22) Filed: Mar. 1, 2000

(30) Foreign Application Priority Data

Mar. 2, 1999 (JP) .......................................... 11-054626
Feb. 25, 2000 (JP) ...................................... 2000-049691

(51) Int. Cl.$^7$ ............................................. G36F 15/16
(52) U.S. Cl. ..................................... 709/206; 709/207
(58) Field of Search ................................ 709/206–207, 709/216–219, 225

(56) References Cited

U.S. PATENT DOCUMENTS

| | | | | |
|---|---|---|---|---|
| 5,765,170 A | * | 6/1998 | Morikawa | 707/200 |
| 5,801,700 A | * | 9/1998 | Ferguson | 345/748 |
| 5,809,242 A | * | 9/1998 | Shaw et al. | 709/217 |
| 5,850,442 A | * | 12/1998 | Muftic | 705/65 |
| 5,867,162 A | * | 2/1999 | O'Leary et al. | 345/843 |
| 5,890,170 A | * | 3/1999 | Sidana | 715/501.1 |
| 5,903,723 A | * | 5/1999 | Beck et al. | 709/200 |
| 5,923,846 A | * | 7/1999 | Gage et al. | 709/217 |
| 5,930,479 A | * | 7/1999 | Hall | 709/238 |
| 5,941,946 A | * | 8/1999 | Baldwin et al. | 709/206 |
| 5,974,446 A | * | 10/1999 | Sonnenreich et al. | 709/204 |
| 6,014,688 A | * | 1/2000 | Venkatraman et al. | 709/206 |
| 6,029,192 A | * | 2/2000 | Hill et al. | 709/206 |
| 6,073,133 A | * | 6/2000 | Chrabaszcz | 707/10 |
| 6,275,850 B1 | * | 8/2001 | Beyda et al. | 709/206 |
| 6,311,195 B1 | * | 10/2001 | Hachiya et al. | 707/512 |
| 6,327,610 B2 | * | 12/2001 | Uchida et al. | 709/206 |
| 6,327,612 B1 | * | 12/2001 | Watanabe | 709/206 |
| 6,356,937 B1 | * | 3/2002 | Montville et al. | 709/206 |
| 6,360,221 B1 | * | 3/2002 | Gough et al. | 707/10 |
| 6,411,393 B1 | * | 6/2002 | Wakasugi | 358/1.15 |
| 6,433,800 B1 | * | 8/2002 | Holtz | 345/835 |
| 6,441,916 B1 | * | 8/2002 | Toyoda | 358/1.15 |
| 6,466,968 B2 | * | 10/2002 | Shirai et al. | 709/206 |
| 6,480,884 B1 | * | 11/2002 | Saito | 709/207 |

* cited by examiner

*Primary Examiner*—Bunjob Jaroenchonwanit
(74) *Attorney, Agent, or Firm*—Fitzpatrick, Cella, Harper & Scinto

(57) ABSTRACT

When a desired document file to be attached to electronic mail is designated, access information relating to the designated document file, e.g., access information relating to the location of the document and privilege to access the document, is acquired. The access information is set by a user through a prescribed user interface. An attachment file which includes this access information is generated and electronic mail to which the generated attachment file has been attached is transmitted. The receiving side acquires and views the corresponding document file in accordance with the attached access information.

49 Claims, 9 Drawing Sheets

FIG. 5

510 ACCESS-KEY FORMAT PRIOR TO ENCRYPTION

| |
|---|
| ABSOLUTE STORAGE POSITION TO DOCUMENT |
| USER NAME |
| PASSWORD |
| ACCESS PRIVILEGE |
| APPLICABLE-DOCUMENT ALL-VERSION ACCESS ENABLE FLAG |
| SAME-FOLDER ALL-DOCUMENT DISPLAY FLAG |
| KEY-FILE VALIDITY DATE |
| ID OF APPLICABLE DOCUMENT |
| ID OF DOCUMENT 1 IN STORAGE AREA IDENTICAL WITH THAT OF APPLICABLE DOCUMENT |
| ID OF DOCUMENT 2 IN STORAGE AREA IDENTICAL WITH THAT OF APPLICABLE DOCUMENT |
| ⋮ |

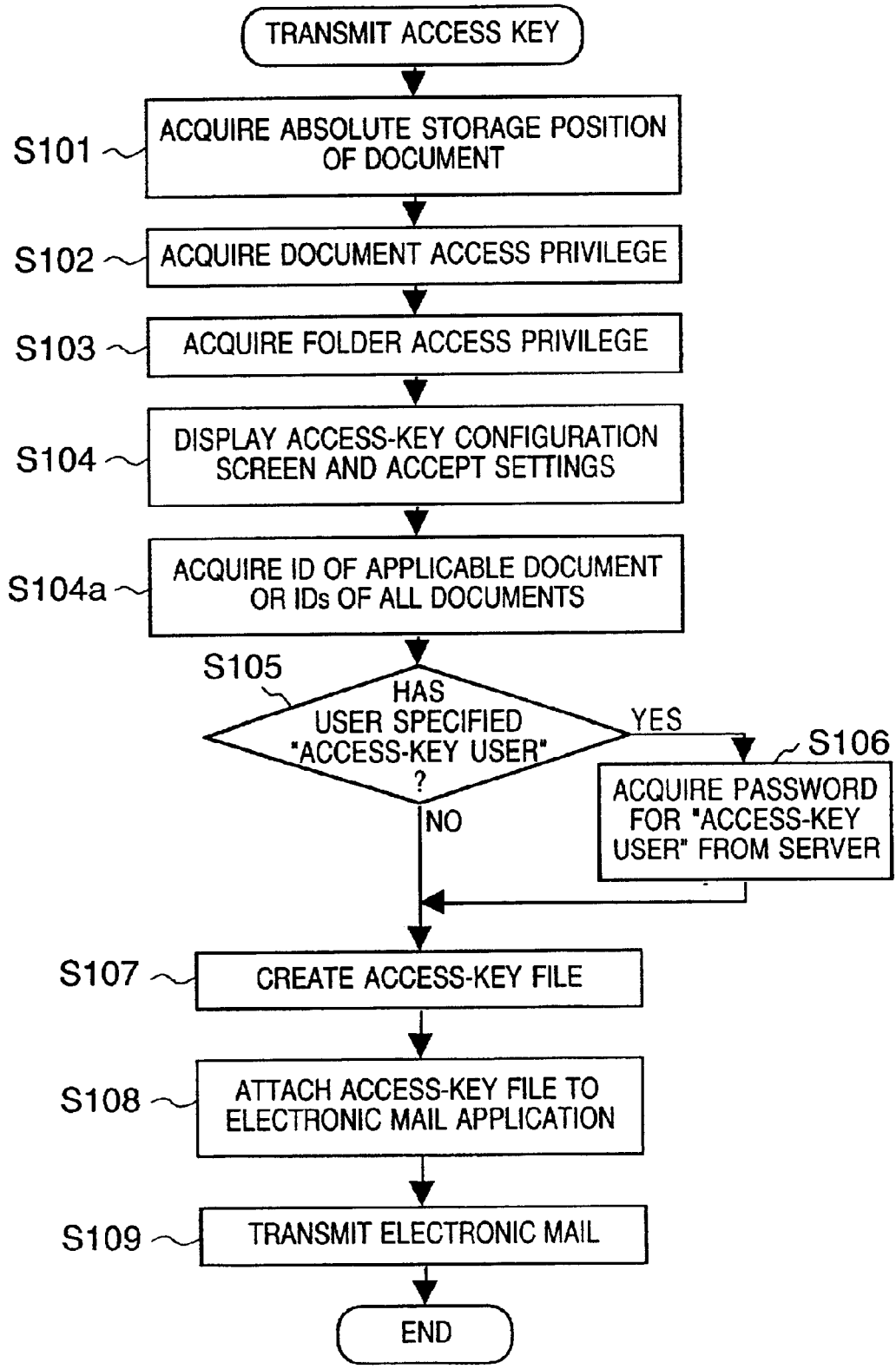

INFORMATION PROCESSING APPARATUS, SYSTEM AND METHOD

FIELD OF THE INVENTION

This invention relates to an information processing apparatus, method and system for transmitting document information within a document management system by electronic mail.

BACKGROUND OF THE INVENTION

In general, when document information in a document management system is transmitted by an electronic mail application, the document information itself or the result of expanding the document into an image having a certain format is transmitted.

However, if the amount of data of the document perse that is to be transmitted is large, a great load is placed upon the electronic mail system. Regarding an image document stored in the document management system, it is possible to add additional information such as annotation information and user's own property information to expanded data. However, when an actual document is attached to an electronic mail, it is not easy to display an actual document and its additional information with explicit indication of the relationship between them. If the actual document can be referred in the format or state in which it was stored in the document management system, the above problem will be solved. However, in order to perform the above operation, it is necessary to ascertain the storage location of the document through a different method and the procedure involved is troublesome.

Furthermore, in a case where the document is referred to in the format in which it was stored in the document management system, there are instances where user registration is necessary in order to access the system in which the document exists. The result is poor operability.

SUMMARY OF THE INVENTION

Accordingly, an object of the present invention is to make it possible to transmit specific information such as the storage location of a document (object) and access privilege without transmitting the actual substance of the object or a file in which the content of the object has been converted to an image, thereby making it possible to display the document easily on the receiving side without increasing the load upon the electronic mail system.

Another object of the present invention is to make it possible to transmit the storage location of a document as the main body of electronic mail so that the document can be displayed easily on the receiving side.

Another object of the present invention is to make it possible for a receiving party to gain temporary access to a document without requiring that the receiving party register as a user with the system in which the document has been stored.

A further object of the present invention is to make it possible for the transmitting side to limit the version of documents accessed by a receiving party, whereby diverse access control can be realized with facility.

A further object of the present invention is to make it possible for a receiving party to access a document within a folder the same as that containing a document specified by the transmitting party, whereby diverse access control can be realized with facility.

According to the present invention, the foregoing objects are attained by providing an information processing apparatus capable of transmitting electronic mail, comprising: designating means for designating a desired object to be attached to electronic mail; acquisition means for acquiring access information relating to the object designated by the designating means; and generating means for generating electronic mail information which includes the access information acquired by the acquisition means.

According to another aspect of the present invention, the foregoing objects are attained by providing an information processing apparatus capable of receiving electronic mail, comprising: extraction means for extracting access information contained in electronic mail that has been received; access means for accessing an object based upon the access information extracted by the extraction means; and display means for presenting a display that corresponds to the object based upon content of the object accessed by the access means.

According to the present invention, the foregoing objects are attained by providing an information processing system in which electronic mail can be transmitted and received between information processing apparatus, comprising: generating means for generating electronic mail which includes access information relating to an object to be attached to electronic mail; communication means for sending and receiving the electronic mail generated by the generating means; and access means for accessing the object based upon the access information contained in the electronic mail received via the communication means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in an constitute a part of the specification, illustrate embodiments of the invention and, together with the description, serve to explain the principles of the invention.

FIG. 5 is a diagram illustrating an access-key format, prior to encryption, generated based upon content configured by the access-key configuration screen shown in FIG. 4;

FIG. 7 is a flowchart useful in describing processing for transmitting an access key according to this embodiment.

DESCRIPTION OF THE PREFERRED EMBODIMENT

A preferred embodiment of the present invention will now be described in detail in accordance with the accompanying drawings.

Figure 1:
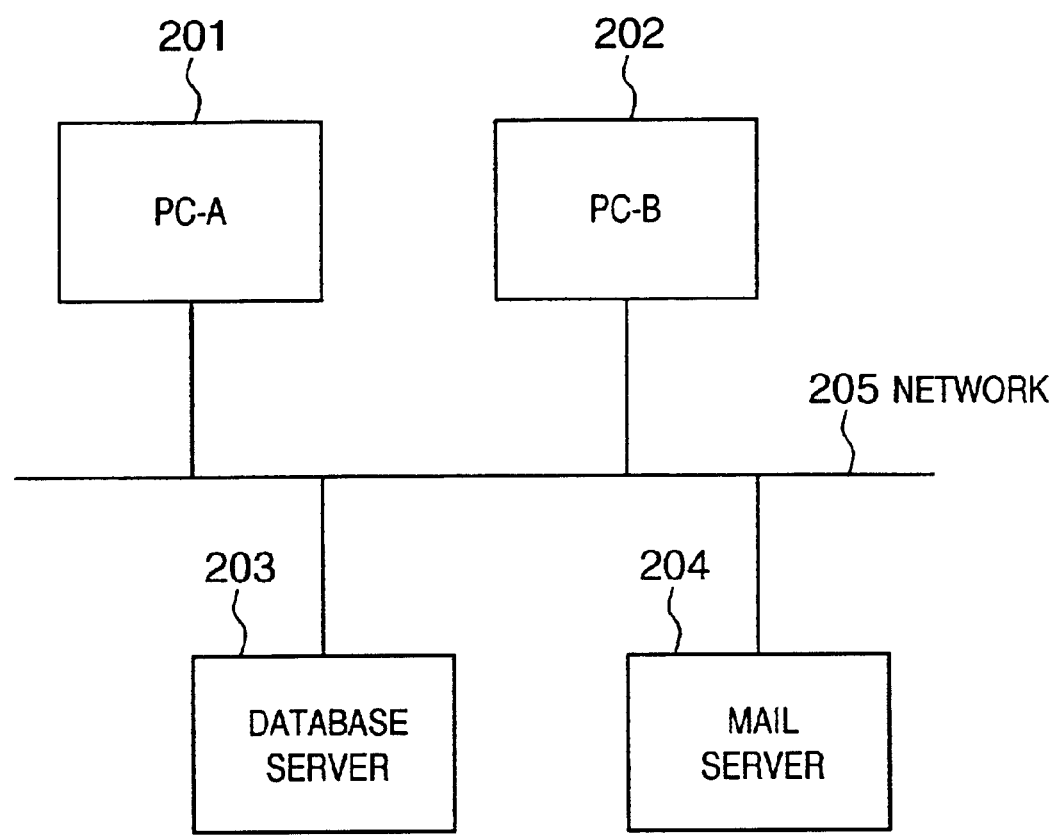
FIG. 1 is a system block diagram illustrating the configuration of an information processing system to which there is applied a scheme for giving notification of document storage information according to an embodiment of the present invention.

FIG. 1 is a system block diagram illustrating the configuration of an information processing system to which there is applied a scheme for giving notification of document storage information according to an embodiment of the present invention. The information processing system comprises at least two computers (PC-A 201 and PC-B 202), a database server 203 and an electronic mail server 204. The computers 201 and 202, which function as mail clients, can be ordinary personal computers or workstations. In this embodiment the database server 203 stores documents and the like to be transmitted by electronic mail. The electronic mail server 204 stores and distributes electronic mail that has been transmitted in the system. The computers 201, 202, database server 203 and main server 204 are connected by a network 205.

Figure 2:
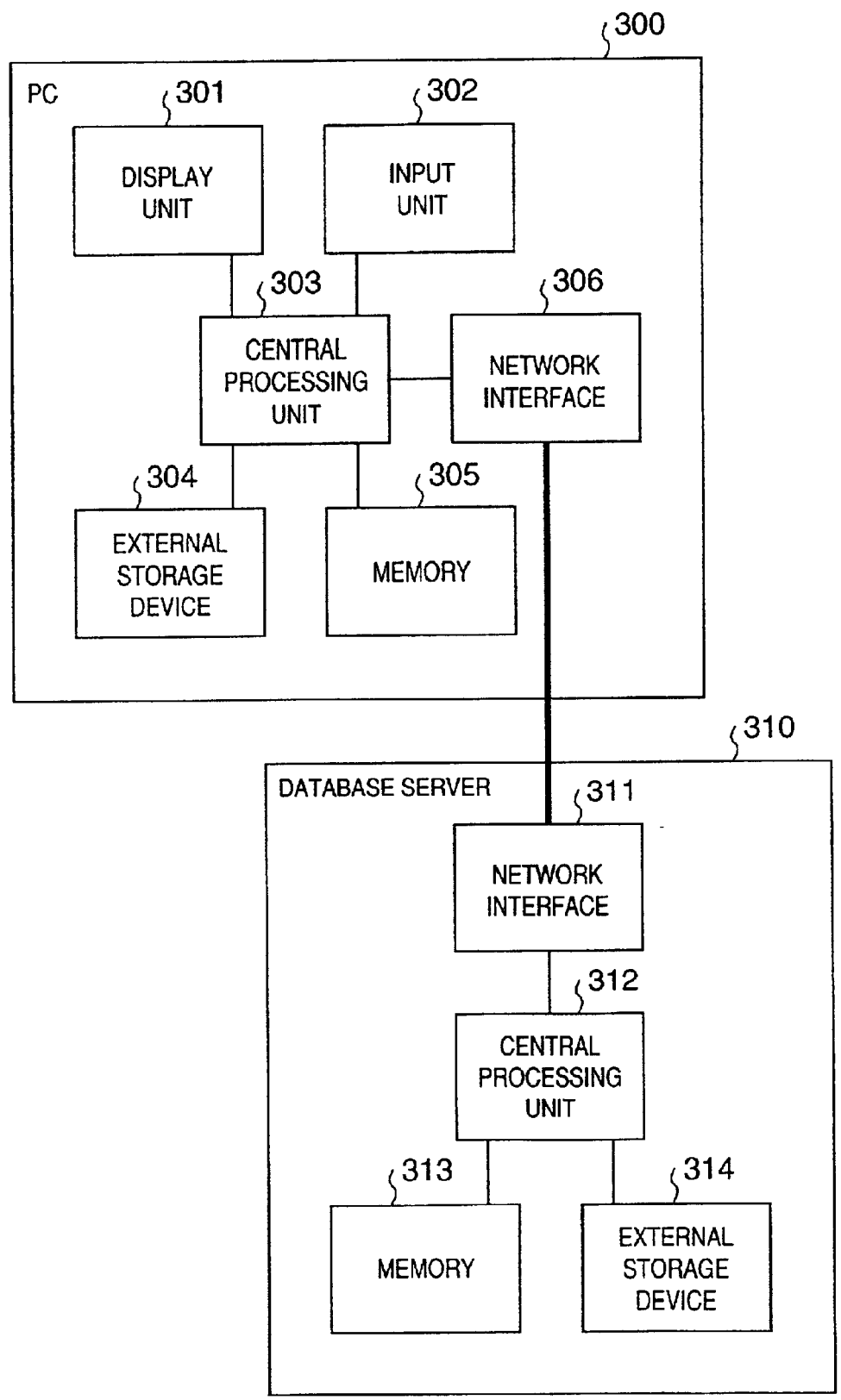
FIG. 2 is a block diagram showing the details of construction of a PC and database server in the information processing system which applies the scheme for giving notification of document storage information according to this embodiment.

FIG. 2 is a block diagram showing the details of construction of a personal computer and database server in the information processing system which applies the scheme for giving notification of document storage information according to this embodiment. As shown in FIG. 2, a personal computer (PC) 300 corresponds to the personal computer 201 or 202 in FIG. 1. The PC 300 includes a display unit 301, an input unit 302, a central processing unit 303, an external storage device 304, a memory 305 and a network interface 306. A database server 310 corresponds to the database server 203 in FIG. 1 and includes a network interface 311, a central processing unit 312, a memory 313 and an external storage device 314. The network interfaces 306 and 311 are connected by a network cable.

The display unit 301 in the PC 300 has a CRT or LCD and presents various displays under the control of the central processing unit 303. The input unit 302 includes a keyboard and a pointing device, for example, and is for making various inputs to the central processing unit 303. The central processing unit 303 implements various processing, described later, by executing a control program that has been stored in the memory 305. The external storage device 304 is a large-capacity non-volatile memory typified by a hard disk or the like. The memory 305, which is constituted by a RAM or the like, provides a working area for the central processing unit 303. The network interface 306 is for making a connection to the Internet by a modem, etc., via a telephone line.

The network interface 311 in the database server 310 is for making a connection to the Internet, by way of example. The central processing unit 312 implements various processing, described later, by executing a control program that has been stored in the memory 313. The external storage device 314 is a large-capacity non-volatile memory typified by a hard disk or the like.

Figure 3:
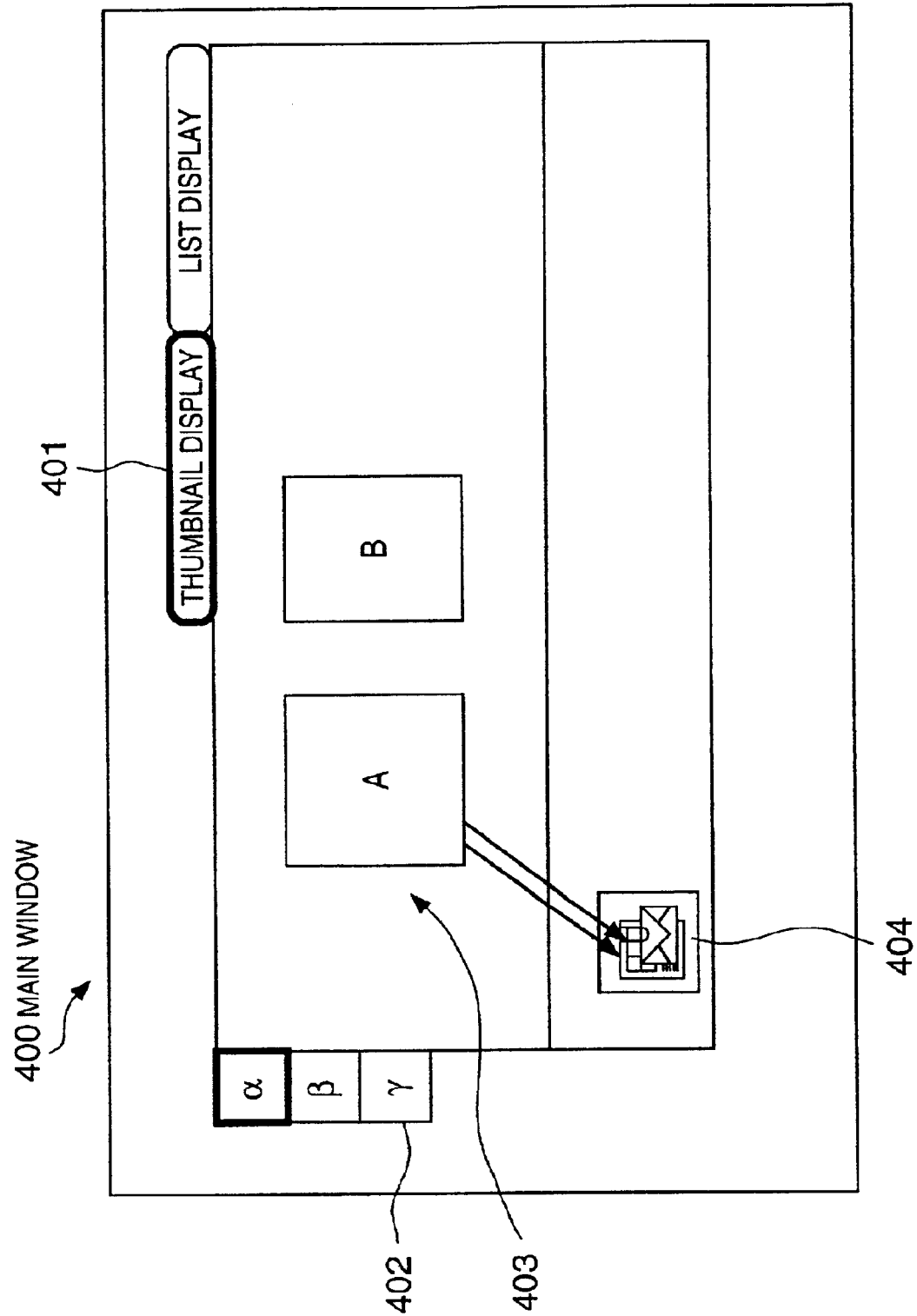
FIG. 3 is a diagram showing an overview of a main window for displaying an at-a-glance view of objects in a document management system or image management system which applies a scheme for giving notification of document storage information according to this embodiment of the present invention.

FIG. 3 is a diagram showing an overview of a main window for displaying an at-a-glance view of objects in a document management system or image management system which applies a scheme for giving notification of document storage information according to this embodiment.

FIG. 3 shows a main window 400. In FIG. 3, objects in a storage area α are displayed in a thumbnail format. In this example, there are two objects, namely A and B. It should be noted that the storage area a corresponds to, e.g., a directory or folder. Buttons 401 are for selecting whether the format of the display presented in an at-a-glance display area 403 is the thumbnail format or a list format. Buttons 402 are for changing the storage area to be displayed in the at-a-glance view. The at-a-glance display area 403 displays objects. More specifically, this is an area in which objects in the storage area selected by the buttons 402 are displayed in an at-a-glance view in a format (thumbnail or list) selected by the buttons 401. FIG. 3 illustrates a state in which a thumbnail display has been selected. An icon 404 corresponds to an electronic mail application. An object displayed as a thumbnail image or an icon displayed in a list in the at-a-glance display area 403 may be dragged and dropped on the icon 404 of the electronic mail application, thereby making it possible to transmit electronic mail to which information relating to this object has been attached.

It should be noted that an object that has been dragged and dropped on the icon 404 of the electronic mail application has version information. In a case where the transmitting party has not allowed the receiving side to access all versions, only an object having the version information can be accessed. This will become clear from a description rendered later.

Figure 4:
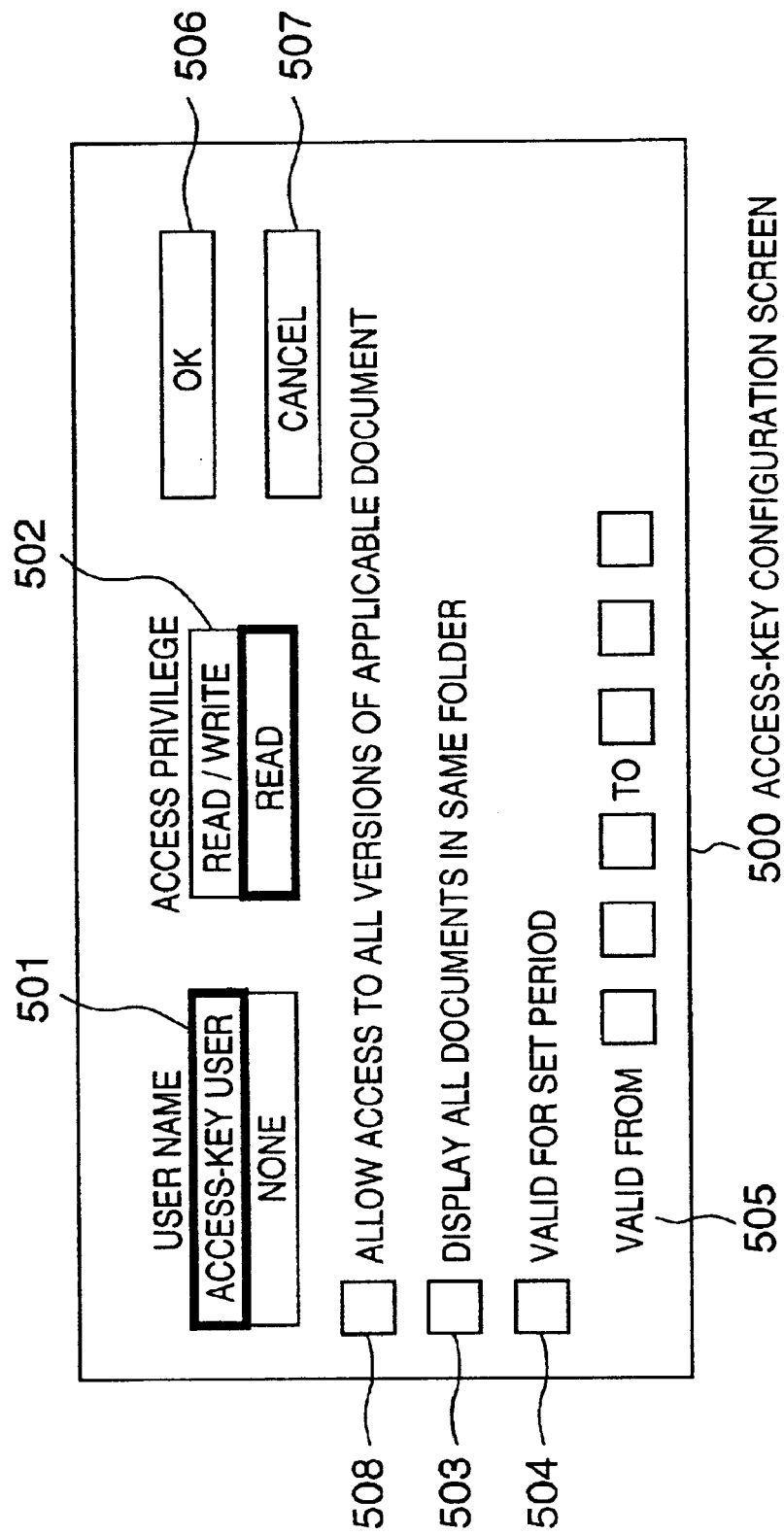
FIG. 4 is a diagram illustrating an access-key configuration screen.

FIG. 4 is a diagram illustrating an access-key configuration screen 500 displayed when one object displayed in at-a-glance form in FIG. 3 has been dropped on the icon 404 of the electronic mail application. This screen enables the setting of information necessary to access the object and to store the information as an access key. The object shall be referred to as a document below. Moreover, in this specification, it will be assumed that the document includes a text file, an image file, etc.

The access-key configuration screen 500 shown in FIG. 4 includes a user name 501 that makes it possible to access this system (e.g., a database server in which the applicable document resides). More specifically, in addition to users who have already been registered with the system, it is possible to set a special "access-key user". Thus, even a user who has not registered as a user with the database storing the document can, by having possession of an access key that includes "access-key user", refer to the document within the database. If "NONE" is selected in the area of user name 501, user-name and password queries are made when access to the database is attempted, whereby a person who has not registered as a user can be denied access to the database.

The access-key configuration screen 500 is configured in the following manner:

Area 502: Sets the privilege [to allow only read (reference) or to allow both read and write (update)] granted to the "access-key user" to access the applicable document.

Area 508: Sets the privilege to access other versions regarding the applicable document;

Area 503: Sets whether or not other documents in the folder containing the document can be displayed when the document is referred to using the access key. In a case where "DISPLAY ALL DOCUMENTS" has been checked, both the access privilege set in area 502 and the access privilege set in the area 508 are similarly validated with regard to all documents.

Area 504: Sets whether or not a period of validity is to be set for the access key that has been created.

Area 505: Sets the period of validity.

If an OK button 506 is pressed (clicked) after the above-mentioned items have been set,. an access-key file is created using the configured content being displayed on the access-key configuration screen 500 and the file is attached to an electronic mail file. If a cancel button 507 is clicked, then processing is suspended without the creation of access-key file.

FIG. 5 is a diagram illustrating an access-key format 510 prior to encryption of an access-key file generated based upon content configured by the access-key configuration screen shown in FIG. 4. Numeral 510 in FIG. 5 denotes the access-key format prior to encryption. Since the access key usually is encrypted, it cannot be referred to or edited directly by a text editor.

In FIG. 5, "ABSOLUTE STORAGE LOCATION OF DOCUMENT" is where the absolute storage location of a dropped document in the database system is set. "USER NAME" is either "ACCESS-KEY USER" or "NONE" entered in the area of user name 501. "PASSWORD" is where a password established by the database system is set only in a case where an access-key user has been set. "ACCESS PRIVILEGE" is set only in a case where "ACCESS-KEY USER" been set. In this example, either "READ/WRITE" or "READ" is set. "APPLICABLE-DOCUMENT ALL-VERSION ACCESS ENABLE FLAG" is where a value (enable/disable) specified using the check box area 508 in FIG. 4 is set. "SAME-FOLDER ALL-DOCUMENT DISPLAY FLAG" is where a value (on/off) specified using the check box area 503 of FIG. 4 is set. "KEY-FILE VALIDITY DATE" is where the period of validity set in area 505 in FIG. 4 is saved only in a case where the check box area 504 of FIG. 4 is checked. "ID OF APPLICABLE DOCUMENT" is where the ID of the selected document is set in a form that includes the version number. If "SAME-FOLDER ALL-DOCUMENT DISPLAY FLAG" is ON, the IDs of all documents present in the same folder are added on in a form that includes the version numbers.

Figure 6A:
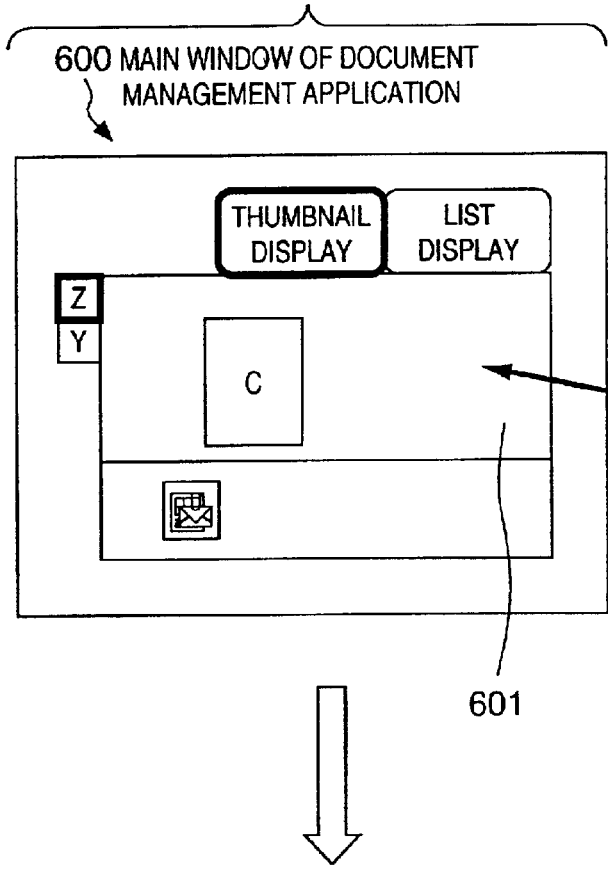
FIGS. 6A, 6B and 6C are diagrams useful in describing examples of screen displays, as well as the operation thereof, in a case where a received access key is used in the scheme for giving notification of document storage information according to this embodiment.
Figure 6B:
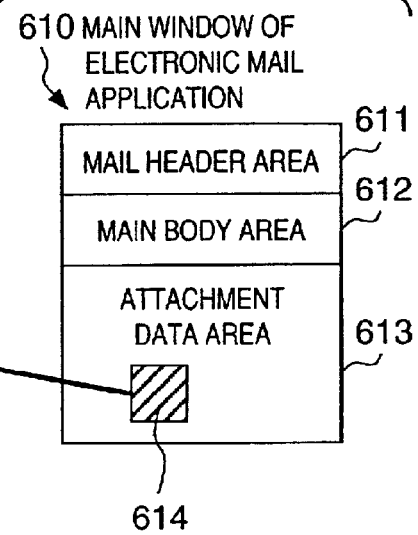
Figure 6C:
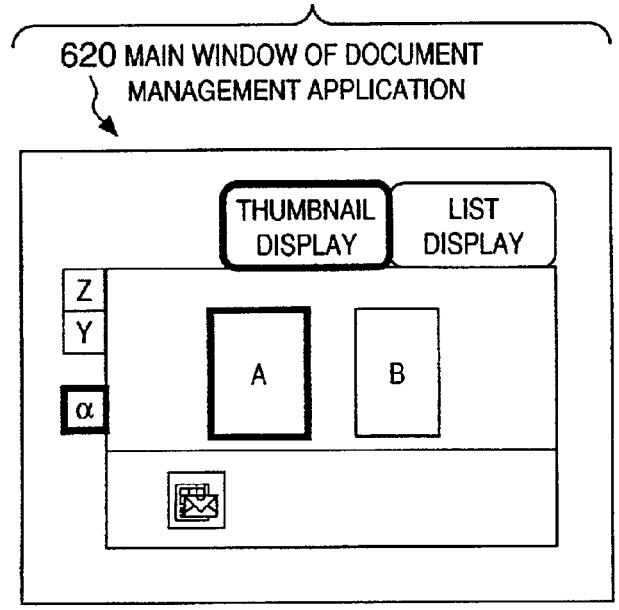

FIGS. 6A, 6B and 6C are diagrams useful in describing examples of screen displays, as well as the operation thereof, in a case where a received access key is used in the scheme for giving notification of document storage information according to this embodiment.

FIG. 6A shows a main window in which an at-a-glance view of documents in a storage area Z is displayed in thumbnail form. Here one document (C) is being displayed in an at-a-glance display area 601.

FIG. 6B illustrates the window of an electronic mail application. A main window 610 of the electronic mail application indicates an overview of a main window displayed by the electronic mail application. As in the manner of a window of an ordinary electronic mail application, the window 610 is divided into a mail header area 611 which displays a mail header, a mail body area 612 which displays the body of mail, and an attachment data area 613 which indicates attachment data. An icon 614 corresponds to an access-key file generated through the above-described procedure and attached to this electronic mail.

If the icon 614 corresponding to the access-key file that has been attached to the received mail is dragged and dropped on the thumbnail image display area 601, the database is accessed based upon the information that has been saved in this access-key file. It is assumed here that the access-key file of icon 614 has been generated on the side of the transmitting party of this electronic mail by dropping document A in storage area α of the personal computer on the transmitting side onto the icon 404 of the electronic mail application in the manner shown in FIG. 3. In this case the window display of the personal computer on the receiving side changes from the content shown in FIG. 6A to the content shown in FIG. 6C. Here, it is assumed that documents A and B exist in the storage area a in the personal computer on the transmitting side and the "SAME-FOLDER ALL-DOCUMENT DISPLAY FRAG" has been turned on. Accordingly, document A, for which an attachment in the storage area α (of the personal computer on the side transmitting the electronic mail) has been specified, and document B, which is contained in the same folder, are being displayed in the main window indicated at 620 in FIG. 6C.

It should be noted that the electronic mail system and electronic mail application being employed in this system are a well-known system and application.

Processing according to this embodiment will be described next.

FIG. 7 is a flowchart useful in describing processing for transmitting an access key according to this embodiment. The flowchart of FIG. 7 will be referred to in order to describe processing executed by the central processing unit 303 of this system for creating an access-key file and for attaching the created access-key file to electronic mail in a case where a document is dropped onto the icon of the electronic mail application. It will be assumed in this embodiment that the user of the personal computer 201 attaches document information in the database server 203 to electronic mail and sends this electronic mail to the user of the personal computer 202, that the electronic mail in such case is accumulated in the electronic mail server 204 and that the electronic mail server 204 notifies the personal computer 202 of the fact the electronic mail arrived. Alternatively, it will be assumed that the electronic mail is sent from the electronic mail server 204 to the user of the personal computer 202

First, at step S101 in FIG. 7, the absolute storage location of a document (document A in storage area α in this example) specified by the operation illustrated in FIG. 3 is acquired through the central processing unit 312 of the database server 310 via the network interfaces 306 and 311. Next, at step S102, the privilege to access this document is acquired at step S102 in a manner similar to that of step S101. Then, at step S103, the privilege to access the folder containing this document is acquired through a similar procedure.

This is followed by step S104, at which the access-key configuration screen 500 is displayed to allow the user to enter the conditions for creation of the access key. It should be noted that the access privilege 502 is restricted so as not to be less stringent than the conditions acquired at step S102. For example, if the document access privilege acquired at step S102 is only "READ", then "READ/WRITE" in access privilege area 502 is dimmed beforehand to make the selection thereof impossible. Similarly, if the folder access privilege acquired at step S103 is "DISPLAY APPLICABLE DOCUMENT ONLY", then the check box of area 503 is dimmed before hand to make selection thereof impossible.

Next, at step S104a, the ID of the selected document is acquired in a format that includes the version. Furthermore, if the "SAME-FOLDER ALL-DOCUMENT DISPLAY FLAG" is ON, then the IDs of all documents present in the same folder are acquired in a format that includes the versions.

This is followed by step S105, at which it is determined whether "ACCESS-KEY USER" has been specified as the user name in area 501 of FIG. 4. If the decision is "NO", then control proceeds to step S107. If, on the other hand, it is found at step S105 that "ACCESS-KEY USER" has been specified as the user name, control proceeds to step S106. Here the password of "ACCESS-KEY USER" is acquired through the central processing unit 312 of database server 310.

An access-key file of the kind shown in FIG. 5 is created at step S107 based upon the information obtained above and the file is subjected to compression processing. The compressed access-key file is attached to the electronic mail application at step S108 and the electronic mail is transmitted at step S109. It should be noted that the operation at step S109 may be executed on the side of the electronic mail application.

Thus, an access-key file corresponding to a desired document is transmitted by electronic mail.

Figure 8A:
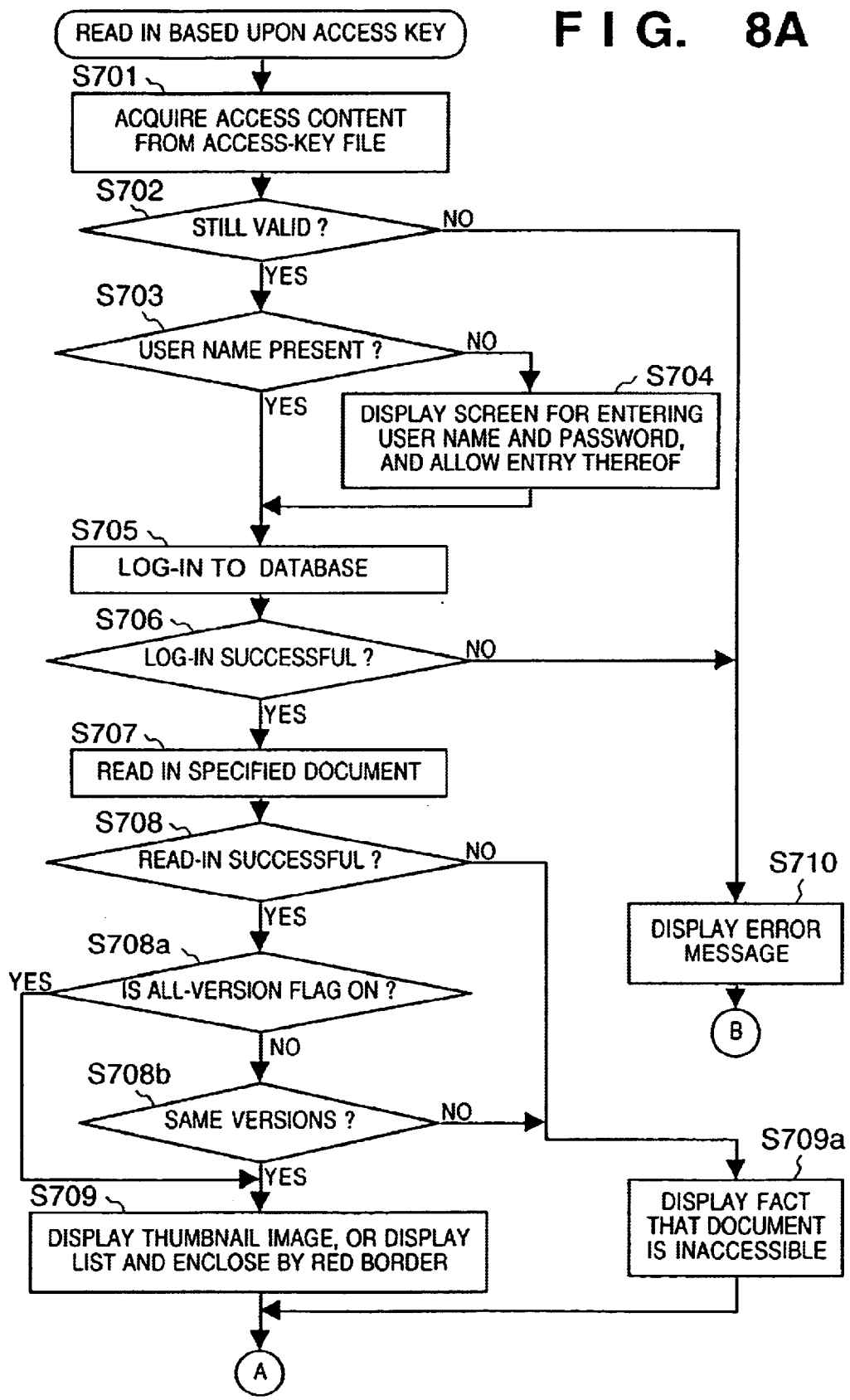
FIGS. 8A and 8B are flowcharts illustrating document display processing that is based upon an access key.
Figure 8B:
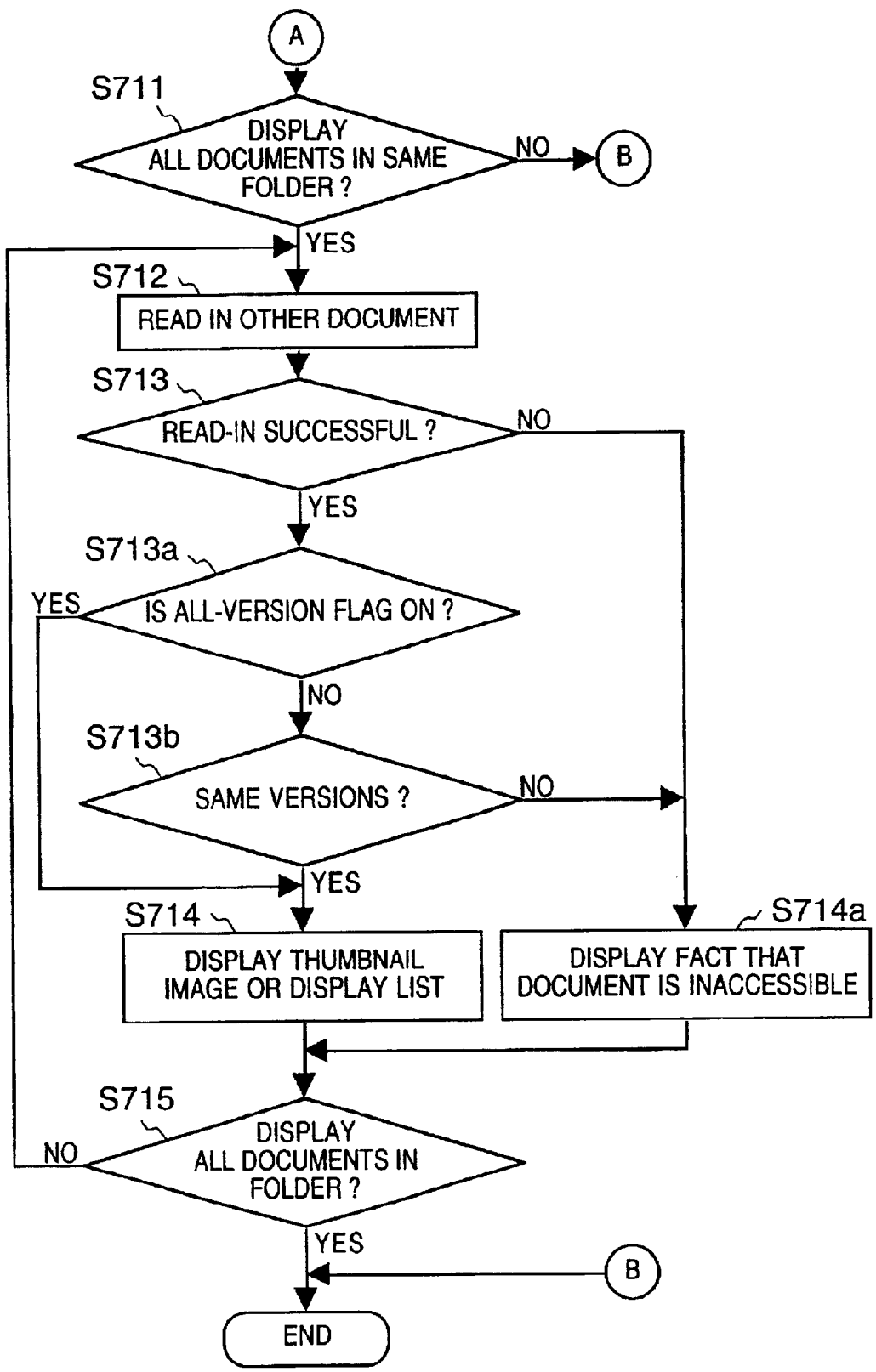

Described next with reference to FIGS. 8A and 8B will be document display processing executed by the central processing unit 303 of this system in a case where the icon 614 corresponding to the access-key file has been dropped on the at-a-glance display area 601 from the attachment data area 613 of the electronic mail application at the apparatus on the side that receives the electronic mail. FIGS. 8A and 8B are flowcharts illustrating document display processing based upon the access key. In this example, the processing described is that executed when electronic mail that has been attached by the user of the personal computer 201 is stored in the electronic mail server 204, the electronic mail server 204 notifies the user of the personal computer 202 that there is incoming electronic mail, the user of the personal computer 202 opens this electronic mail and displays the document in accordance with the access key.

The compressed access-key file corresponding to the icon 614 is uncompressed, the access content (access information) that has been saved in this file is acquired and the content is stored in memory 305 at step S701. This is followed by step S702, at which it is determined whether the date of operation falls within the period indicated by "KEY-FILE VALIDITY DATE" in the access content. If the date of operation falls outside this period, and error message is displayed at step S710 and processing is terminated. If it is determined at step S702 that the date of operation falls within the period of validity, then it is determined at step S703 whether the user name is contained in the access content. If the access content does not have the user name (in case of "NONE" for user name), this means that the document can be referred to only by a registered user. At step S704, therefore, a display for entering the user name and password is displayed to allow the user to set the same.

This is followed by step S705, at which log-in to the database is performed based upon the content that has been saved in the access key and the content that has been entered at step S704. In a case where the user name 501 has been set, log-in to the database is performed based upon the user name and password contained in the access-key format 510 (FIG. 5). Next, it is determined at step S706 whether log-in succeeded. If log-in failed, an error message is displayed at step S710 and processing is terminated. If it is determined at step S706 that log-in succeeded, the specified document is read in at step S707 in accordance with the access content. It is then determined at step S708 whether read-in succeeded. If it is determined that read-in failed, control proceeds to step S709a. In this case, an applicable document does not exist and therefore a display is presented to the effect that the document cannot be accessed. Control thenceforth proceeds to step S711 so that processing relating to display of other documents in this folder may be executed.

If it is determined at step S708 that read-in succeeded, then control proceeds to step S708a, at which it is determined whether the all-version flag is ON or not. If the all-version flag is ON, i.e., if a version check will not be carried out, control proceeds directly to step S709. On the other hand, if the all-version flag is OFF, i.e., if a version check will be carried out, control proceeds to step S708b. Here it is determined whether the version information of the ID that has been stored in the access key matches the version information of the applicable document. If it is determined that a match has been achieved, control proceeds to step S709. Here a display relating to the applicable document is presented and control proceeds to step S711. In regard to step S709, if the method of presenting the display in the main window is in accordance with the thumbnail format, a thumbnail image of the document is displayed in the at-a-glance display area 601. If the method of presenting the display in the main window is in accordance with the list format, the content of a list is displayed in the at-a-glance display area 601. The thumbnail image (or item in the list) corresponding to the applicable document is displayed in such a manner that it can be distinguished as being the specified document. In this example, it is assumed that the applicable thumbnail image enclosed by a red border.

If it is determined at step S708b that the two items of version information do not match, control proceeds to step S709a, at which a display to the effect that the document cannot be displayed is presented. Control then proceeds to step S711. In order to indicate at step S709a that the applicable document could not be accessed, the thumbnail image is displayed in black in the thumbnail mode and an indication to the effect that the document is inaccessible is displayed in the case of the list display.

It is determined at step S711 whether "DISPLAY ALL DOCUMENTS CONTAINED IN SAME FOLDER" has been set in the access content. If it has not been set, processing is terminated. If it is determined at step S711 that "DISPLAY ALL DOCUMENTS CONTAINED IN SAME FOLDER" has been set, then the next document in the same folder is read in at step S712 while taking into consideration also the document ID value at the same storage location as that of the applicable document in the access key. It is determined at step S713 whether read-in succeeded and, if failure is the decision, then control proceeds to step S714a. This means that the document has been deleted. If the decision rendered at step S713 is that read-in succeeded, then it is determined at step S713a whether the all-version flag is ON or not. If the all-version flag is ON, i.e., if a version check will not be carried out, control proceeds directly to step S714. On the other hand, if the all-version flag is found to be OFF at step S713a, i.e., if a version check will be carried out, control proceeds to step S713b. Here it is determined whether the version information of the ID that has been stored in the access key matches. Control proceeds to step S714a if a match is not achieved.

The document is displayed at step S714 in accordance with the display format. In order to indicate at step S714a that the applicable document could not be accessed, the thumbnail image is displayed in black in the thumbnail mode and an indication to the effect that the document-is inaccessible is displayed in the case of the list display. This is followed by step S715, at which it is determined whether all documents in the same folder have been read in, while taking into consideration also the document ID value at the same storage location as that of the applicable document in the access key. Processing is terminated if it is determined that all documents have been read in. If it is determined at step S715 that all documents have not been read in, processing from step S712 onward is repeated.

In the case of the thumbnail display mode in the processing described above, a folder ("α" in FIG. 6C) separate from the folder currently created as shown in FIG. 6C can be created and displayed inside, thereby making it possible to display the folder separately of the area currently open.

By virtue of the foregoing processing, icons or list items of a plurality of documents are displayed in a case where "DISPLAY ALL DOCUMENTS CONTAINED IN SAME FOLDER" has been specified. However, since the icon or list item of a specified document is enclosed by a red border, as mentioned earlier, the user can distinguish this document at a glance.

In accordance with the above embodiment, as described above, only information such as the storage location of a document or the access privilege can be transmitted as an access key by electronic mail to another person without transmitting the actual document or a file that has been converted to an image, whereby it becomes possible to display, in a simple manner, the stored document based upon the access key that has been received.

Further, only the storage location (text data) of a document can be transmitted as the main body of electronic mail to another person, and the stored document can be acquired and displayed in a simple manner based upon the storage location that has been received.

Furthermore, even if a person is not registered as a user with a database in which a document has been stored, it is possible to access the document through an access-key user that has been assigned to an access key.

The foregoing embodiment describes an operation performed in a thumbnail display area. However, if a similar operation is performed in a list display area, similar results will be displayed based upon the list display.

Further, it is possible to obtain a set-up in which only the same version of a document identical with a document designated by the transmitting party can be accessed [this is a case where the "APPLICABLE-DOCUMENT ALL-VERSION ACCESS ENABLE (508) FLAG" is OFF and, moreover, the "SAME-FOLDER ALL-DOCUMENT DISPLAY (503) FLAG" is ON].

Further, it is possible to obtain a set-up in which any version only of a document identical with a document designated by the transmitting party can be accessed [this is a case where the "APPLICABLE-DOCUMENT ALL-VERSION ACCESS ENABLE (508) FLAG" is ON and, moreover, the "SAME-FOLDER ALL-DOCUMENT DISPLAY (503) FLAG" is OFF].

Further, it is possible to obtain a set-up that allows access only to all documents of the same version, which exist when the transmitting party specifies a document, in a folder that same as that of the document when the transmitting party specifies the document. In other words, it is possible to construct an environment identical with that of the document being accessed by the transmitting party [this is a case where the "APPLICABLE-DOCUMENT ALL-VERSION ACCESS ENABLE (508) FLAG" is OFF and, moreover, the "SAME-FOLDER ALL-DOCUMENT DISPLAY (503) FLAG" is ON].

Further, it is possible to obtain a set-up in which all documents of all versions that exist in a folder the same as that of the document specified by the transmitting party is accessed [this is a case where the "APPLICABLE-DOCUMENT ALL-VERSION ACCESS ENABLE (508) FLAG" is ON and, moreover, the "SAME-FOLDER ALL-DOCUMENT DISPLAY (503) FLAG" is ON].

According to the embodiment, it is assumed that the side storing the documents retains all versions. However, the present invention is applicable also in a case where, when update processing has been applied to documents, only the latest documents remain. This merely represents a state in which only the latest versions of documents are available.

It goes without saying that the object of the invention is attained by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the functions of the embodiment, and the storage medium storing the program codes constitutes the invention. By reading the program into the system or apparatus from the storage medium, the system or apparatus will operate in accordance with a predetermined method.

Further, the storage medium for supplying the program code can employ a floppy disk, hard disk, optical disk, magneto-optical disk, CD-ROM, CD-R, magnetic tape, non-volatile type memory card or ROM.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In a case where the present invention is applied to the storage medium, program code corresponding to the flowcharts described earlier in FIGS. 7, 8A and 8B is stored on this storage medium.

Thus, in accordance with the present invention, as described above, it is possible to transmit access information such as the storage location and access privilege of a document without transmitting the actual document or a file in which the document has been converted to an image as the access-key file by using the electronic mail, thereby making it possible to display the document easily on the receiving side without increasing the load upon the electronic mail system.

Further, in accordance with the present invention, it is possible to transmit the storage location of a document as the main body of electronic mail so that the document can be displayed easily on the receiving side.

Further, in accordance with the present invention, it is possible for a receiving party to gain temporary access to a document without requiring that the receiving party register as a user with the system in which the document has been stored.

Further, in accordance with the present invention, it is possible for the transmitting side to limit the version of documents accessed by a receiving party.

Further, in accordance with the present invention, it is possible for a receiving party to access a document within a folder the same as that containing a document specified by the transmitting party.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus with a function of receiving electronic mail, comprising:

extraction means, for extracting; access information contained in electronic mail that has been received, said access information including enabling information indicating whether it is permissible to access all versions of an object;

access means for accessing all versions of the object if the access information extracted by said extraction means indicates that access to all versions of the objects is permissible; and display means for presenting an at-a-glance display inclusive of all versions of the object based upon results of accessing performed by said access means.

2. The apparatus according to claim 1, wherein said display means presents either a thumbnail display or a list display regarding objects accessed by said access means.

3. The apparatus according to claim 1, further comprising:

selection means for selecting a desired object from the at-a-glance display; and content display means for displaying a content of the object that has been selected by said selection means.

4. The apparatus according to claim 1, wherein said extraction means extracts the access information from a file that has been attached to electronic mail.

5. The apparatus according to claim 1, wherein said extraction means extracts the access information from a main body of electronic mail.

6. The apparatus according to claim 1, wherein:

the access information includes position information for specifying a storage location at which the object is present; and using the access information such that said access means accesses the object at the storage location specified by the position information.

7. The apparatus according to claim 6, wherein the access information includes information for logging in to the storage location.

8. An information processing system in which electronic mail is sent and received between information processing apparatuses, comprising:

generating means for generating electronic mail information, which includes access information including enabling information indicating whether it is permissible to access all versions of an object, stored in storage means, to be accessed by a receiver of the electronic mail;

communication means for sending and receiving the electronic mail information generated by said generating means;

extraction means for extracting the access information contained in electronic mail that has been received via said communication means;

access means for accessing all versions of the object if the access information contained in the electronic mail information indicates that access to all versions of the objects is permitted; and display means for presenting an at-a-glance display inclusive of all versions of the object based upon results of accessing performed by said access means.

9. The system according to claim 8, wherein said generating means includes:

designating means for designating a desired object to be attached to electronic mail;

acquisition means for acquiring access information relating to the object designated by said designating means; and mail information generating means for generating electronic mail information in which the access information acquired by said acquisition means constitutes part of the electronic mail.

10. The system according to claim 9, wherein said mail information generating means generates an attachment file, which includes the access information acquired by said acquisition means, and attaches the generated attachment file to electronic mail that is to be transmitted.

11. The system according to claim 9, wherein said mail information generating means affixes the access information, which has been acquired by said acquisition means, to a main body of electronic mail that is to be transmitted.

12. The system according to claim 9, wherein the access information includes information indicating a storage location of the object, which has been designated by said designating means, in said system.

13. The system according to claim 9, wherein said designating means has display means for presenting an at-a-glance display, in a thumbnail or list format, of documents that are present in a specific storage area, and for displaying an icon corresponding to an electronic mail application that is for generating and transmitting electronic mail; and wherein, when a desired document among the documents in the at-a-glance display is dropped onto the icon, the desired document is designated.

14. The system according to claim 9, wherein said acquisition means includes setting means for allowing a user to set access information via a prescribed user interface.

15. The system according to claim 9, further comprising setting means for setting whether or not to provide the access information to an unregistered user, who has not registered as a user, as a part of the access information.

16. The system according to claim 15, further comprising means for giving a password to the unregistered user when said setting means has set that the unregistered user may be provided with the access information.

17. The system according to claim 15, further comprising means for prohibiting the unregistered user from accessing the object when said setting means has set that the unregistered user is not to be provided with the access information.

18. The system according to claim 8, wherein said communication means transmits the electronic mail information, which has been generated by said generating means, to an information processing apparatus that has been designated.

19. The system according to claim 8, wherein said display means presents either a thumbnail display or a list display regarding objects accessed by said access means.

20. The system according to claim 8, further comprising:
selection means for selecting a desired object from the at-a-glance display; and
content display means for displaying a content of the object that has been selected by said selection means.

21. The system according to claim 8, wherein said extraction means extracts the access information from a file that has been attached to electronic mail.

22. The system according to claim 8, wherein said extraction means extracts the access information from a main body of electronic mail.

23. The system according to claim 8, wherein:
the access information includes position information for specifying a storage location at which the object is present; and
the access information is used such that said object access means accesses the object at the storage location specified by the position information.

24. The system according to claim 8, wherein the access information includes information for logging in to the storage location.

25. An information processing method in an apparatus with a function of receiving electronic mail, said method comprising:
an extraction step, of extracting access information contained in electronic mail that has been received, said access information including enabling information indicating whether it is permissible to access all versions of an object;
an access step, of accessing all versions of the object if the access information extracted in said extraction step indicates that access to all versions of the object is permissible; and
a display step, of presenting an at-a-glance display inclusive of all versions of the object based upon result of accessing performed in said access step.

26. The method according to claim 25, wherein said display step presents either a thumbnail display or a list display regarding objects accessed at said access step.

27. The method according to claim 25, further comprising:
a selection step of selecting a desired object from the at-a-glance display; and
a content display step of displaying a content of the object that has been selected at said selection step.

28. The method according to claim 25, wherein said extraction step extracts the access information from a file that has been attached to electronic mail.

29. The method according to claim 25, wherein said extraction step extracts the access information from a main body of electronic mail.

30. The method according to claim 25, wherein:
the access information includes position information for specifying a storage location at which the object is present; and
the access information is used such that said access step accesses the object at the storage location specified by the position information.

31. The method according to claim 30, wherein the access information includes information for logging in to the storage location.

32. A method of controlling an information processing system in which electronic mail is sent and received between information processing apparatuses, said method comprising:
a generating step of generating electronic mail information, which includes access information indicating enabling information indicating whether it is permissible to access all versions of an object, stored in a storage unit, to be accessed by a receiving information processing apparatus of the electronic mail;
a communication step of sending and receiving the electronic mail information generated at said generating step;
an extraction step of extracting the access information contained in electronic mail that has been received in said communication step;
an access step of accessing all versions of the object based if the access information contained in the electronic mail information indicates that access to all versions of the object is permitted; and
a display step of presenting an at-a-glance display inclusive of all versions of the object based upon result of accessing performed at said access step.

33. The method according to claim 32, wherein said generating step includes:
a designating step of designating a desired object to be attached to electronic mail;
an acquisition step of acquiring access information relating to the object designated at said designating step; and
mail information generating step of generating electronic mail information in which the access information acquired at said acquisition step constitutes part of the electronic mail.

34. The method according to claim 33, further comprising a setting step of setting whether or not to provide the access information to an unregistered user, who has not registered as a user, as a part of the access information.

35. The method according to claim 34, further comprising a step of giving a password to the unregistered user when said setting step has set that the unregistered user may be provided with the access information.

36. The method according to claim 34, further comprising a step of prohibiting the unregistered user from accessing the object when said setting step has set that the unregistered user is not to be provided with the access information.

37. The method according to claim 33, wherein said mail information generating step generates an attachment file, which includes the access information acquired at said acquisition step, and attaches the generated attachment file to electronic mail that is to be transmitted.

38. The method according to claim 33, wherein said mail information generating step affixes the access information, which has been acquired at said acquisition step, to a main body of electronic mail that is to be transmitted.

39. The method according to claim 33, wherein the access information includes information indicating a storage location of the object, which has been designated at said designating step, in the system.

40. The method according to claim 33, wherein:
said designating step includes a display step of presenting an at-a-glance display, in a thumbnail or list format, of documents that are present in a specific storage area, and of displaying an icon corresponding to an electronic mail application that is for generating and transmitting electronic mail; and
wherein, when a desired document among the documents in the at-a-glance display is dropped onto the icon, the desired document is designated.

41. The method according to claim 33, wherein said acquisition step includes a setting step of allowing a user to set access information via a prescribed user interface.

42. The method according to claim 32, wherein said communication step transmits the electronic mail information, which has been generated at said generating step, to an information processing apparatus that has been designated.

43. The method according to claim 32, wherein said display step presents either a thumbnail display or a list display regarding objects accessed at said access step.

44. The method according to claim 32, further comprising:
a selection step of selecting a desired object from the at-a-glance display; and
a content display step of displaying a content of the object that has been selected at said selection step.

45. The method according to claim 32, wherein said extraction step extracts the access information from a file that has been attached to electronic mail.

46. The method according to claim 32, wherein said extraction step extracts the access information from a main body of electronic mail.

47. The method according to claim 32, wherein:
the access information includes position information for specifying a storage location at which the object is present; and
the access information is used such that said object access step accesses the object at the storage location specified by the position information.

48. The method according to claim 47, wherein the access information includes information for logging in to the storage location.

49. A computer-readable memory storing a control program for causing a computer to process received mail, the control program comprising:
code of an extraction step, of extracting access information contained in electronic mail that has been received, said access information including enabling information indicating whether it is permissible to access all versions of an object;
code of an access step, of accessing all versions of the object under the version limitation specified-by if the access information extracted by said extraction means indicates that access to all versions of the objects is permissible; and
code of a display step, of presenting an at-a-glance display inclusive of all version of the object based upon results of accessing performed in said access step.

* * * * *

UNITED STATES PATENT AND TRADEMARK OFFICE
CERTIFICATE OF CORRECTION

PATENT NO. : 6,920,482 B1
DATED : July 19, 2005
INVENTOR(S) : Hiroyuki Fujiyoshi It is certified that error appears in the above-identified patent and that said Letters Patent is hereby corrected as shown below:

Column 1,
Line 18, "perse" should read -- per se --.

Column 2,
Line 40, "an" should read -- and --.

Column 4,
Line 8, "area a" should read -- area α --.

Column 6,
Line 9, "area a" should read -- area α --;
Line 11, "FRAG"" should read -- FLAG" --;
Line 38, "computer 202" should read -- computer 202. --; and
Line 60, "before hand" should read -- beforehand --.

Column 8,
Line 27, "enclosed" should read -- is enclosed --.

Column 9,
Line 56, "that" should read -- the --.

Column 11,
Line 16, "extracting;" should read -- extracting --; and
Line 23, "objects" should read -- object --.

Column 12,
Line 4, "objects" should read -- object --.

Column 14,
Line 11, "based" should be deleted; and
Line 25, "mail" should read -- a mail --.

UNITED STATES PATENT AND TRADEMARK OFFICE
CERTIFICATE OF CORRECTION

PATENT NO. : 6,920,482 B1
DATED : July 19, 2005
INVENTOR(S) : Hiroyuki Fujiyoshi It is certified that error appears in the above-identified patent and that said Letters Patent is hereby corrected as shown below:

<u>Column 16,</u>
Line 18, "objects" should read -- object --; and
Line 21, "version" should read -- versions --.

Signed and Sealed this

Sixteenth Day of May, 2006

JON W. DUDAS
*Director of the United States Patent and Trademark Office*